(12) United States Patent
Vandermeijden et al.

(10) Patent No.: US 12,204,716 B2
(45) Date of Patent: Jan. 21, 2025

(54) CAPACITIVE COMMUNICATION CHANNEL FOR AUXILIARY DEVICES

(71) Applicant: Synaptics Incorporated, San Jose, CA (US)

(72) Inventors: Tom Vandermeijden, San Jose, CA (US); Samuel Toba, Menlo Park, CA (US); Ching-Hsung Wang, San Jose, CA (US)

(73) Assignee: Synaptics Incorporated, San Jose, CA (US)

( * ) Notice: Subject to any disclaimer, the term of this patent is extended or adjusted under 35 U.S.C. 154(b) by 435 days.

(21) Appl. No.: 17/738,619

(22) Filed: May 6, 2022

(65) Prior Publication Data

US 2022/0404940 A1  Dec. 22, 2022

Related U.S. Application Data

(60) Provisional application No. 63/211,339, filed on Jun. 16, 2021.

(51) Int. Cl.
    G06F 3/041       (2006.01)
    G06F 3/044       (2006.01)

(52) U.S. Cl.
    CPC ........ G06F 3/04164 (2019.05); G06F 3/0446 (2019.05); G06F 2203/04108 (2013.01)

(58) Field of Classification Search
    None
    See application file for complete search history.

(56) References Cited

U.S. PATENT DOCUMENTS

| | | | |
|---|---|---|---|
| 10,860,127 B2* | 12/2020 | Lim | G06F 3/0443 |
| 2013/0271414 A1* | 10/2013 | Graumann | G06F 3/0446 |
| | | | 345/173 |
| 2017/0031514 A1* | 2/2017 | Kimura | G02F 1/13338 |
| 2017/0348592 A1* | 12/2017 | Tanaka | A63F 13/428 |

OTHER PUBLICATIONS

USI_Universal Stylus Initiative, "Stylus and DeviceTechnical Specification 1.0"; Jun. 30, 2016 (181 pages).
USI_Universal Stylus Initiative, "Stylus and Device Technical Specification 1.0—Errata 1.06"; Jun. 7, 2019 (44 pages).
Schoon, "Hands on: 'USI' brings a Stylus Standard that Works Great on Chrome OS and Beyond", 9to5Google, May 12, 2020, 9 pages.

* cited by examiner

Primary Examiner — Krishna P Neupane
(74) Attorney, Agent, or Firm — Leydig, Voit & Mayer, Ltd.

(57) ABSTRACT

A capacitive input device includes sensing electrodes configured to form a capacitive coupling with auxiliary device electrodes of an attached auxiliary device. The auxiliary device electrodes transmit data signals to the sensing electrodes via the capacitive coupling. The capacitive input device also includes processing circuitry configured to decode the data signals received via the capacitive coupling to obtain decoded data.

20 Claims, 7 Drawing Sheets

CAPACITIVE COMMUNICATION CHANNEL FOR AUXILIARY DEVICES

CROSS-REFERENCE TO RELATED APPLICATIONS

This application is a non-provisional application of, and therefore, claims benefit under 35 U.S.C. 119(e), to U.S. Patent Application Ser. No. 63/211,339, filed on Jun. 16, 2021. U.S. Patent Application Ser. No. 63/211,339 is incorporated by reference in its entirety.

FIELD

This invention generally relates to communication channel between an auxiliary device and an input device.

BACKGROUND

Input devices, such as proximity sensor devices (e.g., touchpads or touch sensor devices), are widely used in a variety of electronic systems. A proximity sensor device may include a sensing region, often demarked by a surface, in which the proximity sensor device determines the presence, location and/or motion of one or more input objects. Proximity sensor devices may be used to provide interfaces for the electronic system. For example, proximity sensor devices may be used as input devices for various computing systems (such as touchscreens and touchpads in cellular phones, televisions, personal computers, cars, etc.).

SUMMARY

In general, in one aspect, one or more embodiments relate to a capacitive input device that includes sensing electrodes configured to form a capacitive coupling with auxiliary device electrodes of an attached auxiliary device. The auxiliary device electrodes transmit data signals to the sensing electrodes via the capacitive coupling. The capacitive input device also includes processing circuitry configured to decode the data signals received via the capacitive coupling to obtain decoded data.

In general, in one aspect, one or more embodiments relate to a system that includes an auxiliary device including an input element configured to receive input from a user, a processing component coupled to the input element and configured to process the input to obtain data, and port circuitry coupled to the processing component and comprising auxiliary device electrodes configured to form a first capacitive coupling with sensing electrodes of an attached capacitive input device. The port circuitry is configured to drive the auxiliary device electrodes with data signals that encode the data, which is received as input into the input element.

In general, in one aspect, one or more embodiments relate to a method that includes attaching an auxiliary device to a capacitive input device, receiving, by the capacitive input device, input from an input element of the auxiliary device, and generating data signals from the input. The method further includes transmitting first data signals via a first capacitive coupling between a first plurality of auxiliary device electrodes on the first auxiliary device and a first plurality of sensor electrodes on the capacitive input device.

Other aspects of the invention will be apparent from the following description and the appended claims.

BRIEF DESCRIPTION OF DRAWINGS

Exemplary embodiments will be described in conjunction with the appended drawings, where like designations denote like elements.

DETAILED DESCRIPTION

Figure 1:
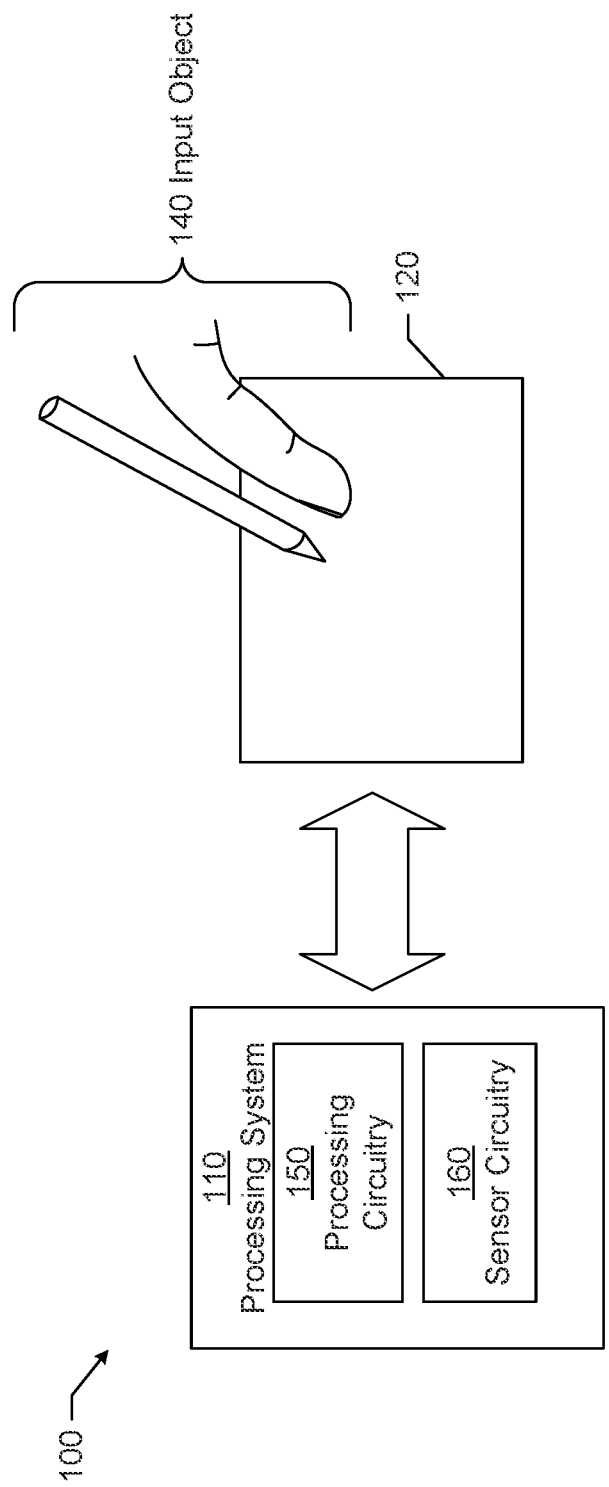
FIG. 1 is a block diagram of an example system that includes a capacitive input device in accordance with an embodiment of the disclosure.

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

In the following detailed description of embodiments, numerous specific details are set forth in order to provide a more thorough understanding of the disclosed technology. However, it will be apparent to one of ordinary skill in the art that the disclosed technology may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Various embodiments of the present invention provide capacitive input devices and methods that facilitate improved usability. In particular, one or more embodiments are directed to a capacitive communication channel for auxiliary devices. In one or more embodiments, during an entire time of use of the auxiliary device, the auxiliary device is attached to a capacitive input device and is stationary with respect to and adjacent to one or more sensing electrodes of the capacitive input device.

When the auxiliary device is attached, communication between the auxiliary device and the capacitive input device is not through movement (e.g., change in position of the auxiliary device relative to the capacitive input device). Rather, communication is achieved by modifying the signal capacitively transmitted between auxiliary device electrodes of the auxiliary device and the sensing electrodes of the capacitive input device. Namely, for transmission from the auxiliary device to the capacitive input device, the auxiliary device modifies the signal on the auxiliary device transmitter electrodes of the auxiliary device according to data being transmitted. The receiver electrodes of the capacitive input device receive a resulting data signal that is affected by the modified signal. Conversely, for transmission from the capacitive input device to the auxiliary device, the capacitive input device modifies the signal on the transmitter electrodes of the capacitive input device according to data being transmitted. The receiver electrodes of the auxiliary device receive a resulting signal that is affected by the modified signal.

Turning now to the figures, FIG. 1 shows a block diagram of an exemplary capacitive input device (100), in accordance with embodiments of the disclosure. The capacitive input device (100) may be configured to provide input to an electronic system (not shown for simplicity). The term "electronic system" broadly refers to any system capable of electronically processing information. Some non-limiting examples of electronic systems include personal computers of all sizes and shapes, such as desktop computers, laptop computers, netbook computers, tablets, web browsers, e-book readers, and cellular telephones. Other examples include automotive user interfaces configured to give drivers user interface capabilities. Additionally, the electronic system could be a host or a slave to the capacitive input device.

The capacitive input device (100) may be implemented as a physical part of the electronic system. In the alternative, the capacitive input device (100) may be physically separate from the electronic system. The capacitive input device (100) may be coupled to (and communicate with) components of the electronic system using various wired or wireless interconnections and communication technologies.

In the example of FIG. 1, the capacitive input device (100) may correspond to a proximity sensor device (such as a touch screen, or any other touch sensor device) configured to sense input provided by one or more input objects (140) in a sensing region (120). Example input objects include fingers and styli. An example of a stylus is an active pen. An active pen moves across the sensing region and transmits a transmitter signal that is used to detect the location of the active pen and determine additional information. An example of an active pen is a USI pen (e.g., USI stylus). In general, USI (Universal Stylus Initiative) defines standards for interoperable communication between pens and touch-enabled devices, such as tablets and phones.

Continuing with FIG. 1, the sensing region (120) may encompass any space above, around, in and/or near the capacitive input device (100) in which the capacitive input device (100) is able to detect user input (e.g., provided by one or more input objects (140)). The sizes, shapes, and locations of particular sensing regions may vary depending on actual implementations.

In some embodiments, the sensing region (120) extends from a surface of the capacitive input device (100) in one or more directions into space, for example, until a signal-to-noise ratio falls below a threshold suitable for object detection. For example, the distance to which this sensing region (120) extends in a particular direction, in various embodiments, may be on the order of less than a millimeter, millimeters, centimeters, or more, and may vary with the type of sensing technology used and/or the accuracy desired. In some embodiments, the sensing region (120) detects inputs involving no physical contact with any surfaces of the capacitive input device (100), contact with an input surface (e.g. a touch surface) of the capacitive input device (100), contact with an input surface of the capacitive input device (100) coupled with some amount of applied force or pressure, and/or a combination thereof.

In various embodiments, input surfaces may be provided by surfaces of a housing of the capacitive input device (100) within which the sensor electrodes reside, by face sheets applied over the sensor electrodes or any casings, etc. In some embodiments, the sensing region (120) has a rectangular shape when projected onto an input surface of the capacitive input device (100).

In some embodiments, the capacitive input device (100) may utilize capacitive sensing technologies to detect user input. For example, the sensing region (120) may input one or more capacitive sensing elements (e.g., sensor electrodes) to create an electric field. The capacitive input device (100) may detect inputs based on changes in the capacitance of the sensor electrodes. More specifically, an object in contact with (or in close proximity to) the electric field may cause changes in the voltage and/or current in the sensor electrodes. Such changes in voltage and/or current may be detected as "signals" indicative of user input. The sensor electrodes may be arranged in arrays or other regular or irregular patterns of capacitive sensing elements to create electric fields. In some implementations, some sensing elements may be ohmically shorted together to form larger sensor electrodes. Some capacitive sensing technologies may utilize resistive sheets that provide a uniform layer of resistance.

Transcapacitance sensing methods detect changes in the capacitive coupling between sensor electrodes. For example, an input object (140) near the sensor electrodes may alter the electric field between the sensor electrodes, thus changing the measured capacitive coupling of the sensor electrodes. In some embodiments, the capacitive input device (100) may implement transcapacitance sensing by detecting the capacitive coupling between one or more transmitter sensor electrodes (also "transmitter electrodes" or "transmitter") and one or more receiver sensor electrodes (also "receiver electrodes" or "receiver"). Signals on the transmitter sensor electrodes may be modulated relative to a reference voltage (e.g., system ground) to transmit transmitter signals while receiver sensor electrodes may be held at a substantially constant voltage relative to the reference voltage to receive resulting signals. The reference voltage may be a substantially constant voltage or may be system ground. The resulting signal may be affected by environmental interference (e.g., other electromagnetic signals) as well as input objects in contact with, or in close proximity to, the sensor electrodes. Sensor electrodes may be dedicated transmitters or receivers, or may be configured to both transmit and receive. Measurements acquired using mutual capacitance sensing methods may be referred to as mutual capacitance measurements.

Further, the sensor electrodes may be of varying shapes and/or sizes. The same shapes and/or sizes of sensor electrodes may or may not be in the same groups. For example, in some embodiments, receiver electrodes may be of the same shapes and/or sizes while, in other embodiments, receiver electrodes may be varying shapes and/or sizes.

The processing system (110) may be configured to operate the hardware of the capacitive input device (100) to detect input in the sensing region (120). The processing system (110) may include parts of, or all of, one or more integrated circuits (ICs) and/or other circuitry components and firmware. In some embodiments, the processing system (110) may include processing circuitry (150) configured to determine when at least one input object (140) is in a sensing region (120), determine whether the input object (140) is a stylus, determine signal to noise ratio, determine positional information of an input object (140), identify a gesture, determine an action to perform based on the gesture, a combination of gestures or other information, and/or perform other operations. In some embodiments, the processing system (110) may include sensor circuitry (160) configured to drive the sensing elements to transmit transmitter signals and receive the resulting signals. In some embodiments, the sensor circuitry (160) may include sensor circuitry that is coupled to the sensor electrodes.

In some embodiments, the capacitive input device (100) includes a touch screen interface, and the sensing region (120) overlaps at least part of an active area of a display screen. For example, the capacitive input device (100) may include substantially transparent sensor electrodes overlaying the display screen and provide a touch screen interface for the associated electronic system. The display screen may be any type of dynamic display capable of displaying a visual interface to a user. The capacitive input device (100) and the display screen may share physical elements. For example, some embodiments may utilize some of the same electrical components for displaying and sensing. In various embodiments, one or more display electrodes of a display device may be configured for both display updating and input sensing. As another example, the display screen may be operated in part or in total by the processing system (110).

While FIG. 1 shows a configuration of components, other configurations may be used without departing from the scope of the disclosure. For example, various components may be combined to create a single component. As another example, the functionality performed by a single component may be performed by two or more components.

Figure 2:
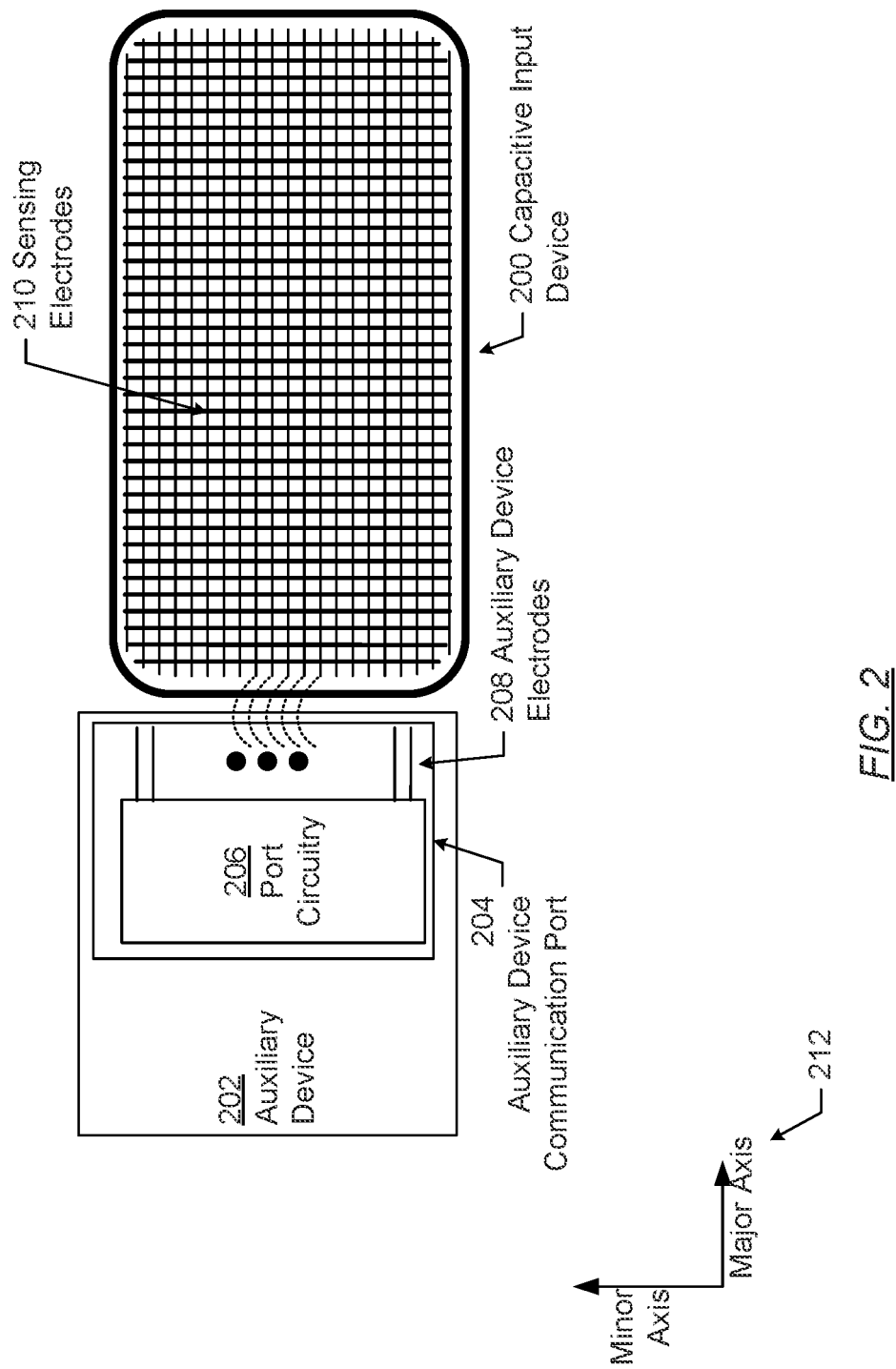
FIG. 2 is a block diagram of a system that has a capacitive communication channel for auxiliary devices in accordance with an embodiment of the disclosure.
Figure 3:
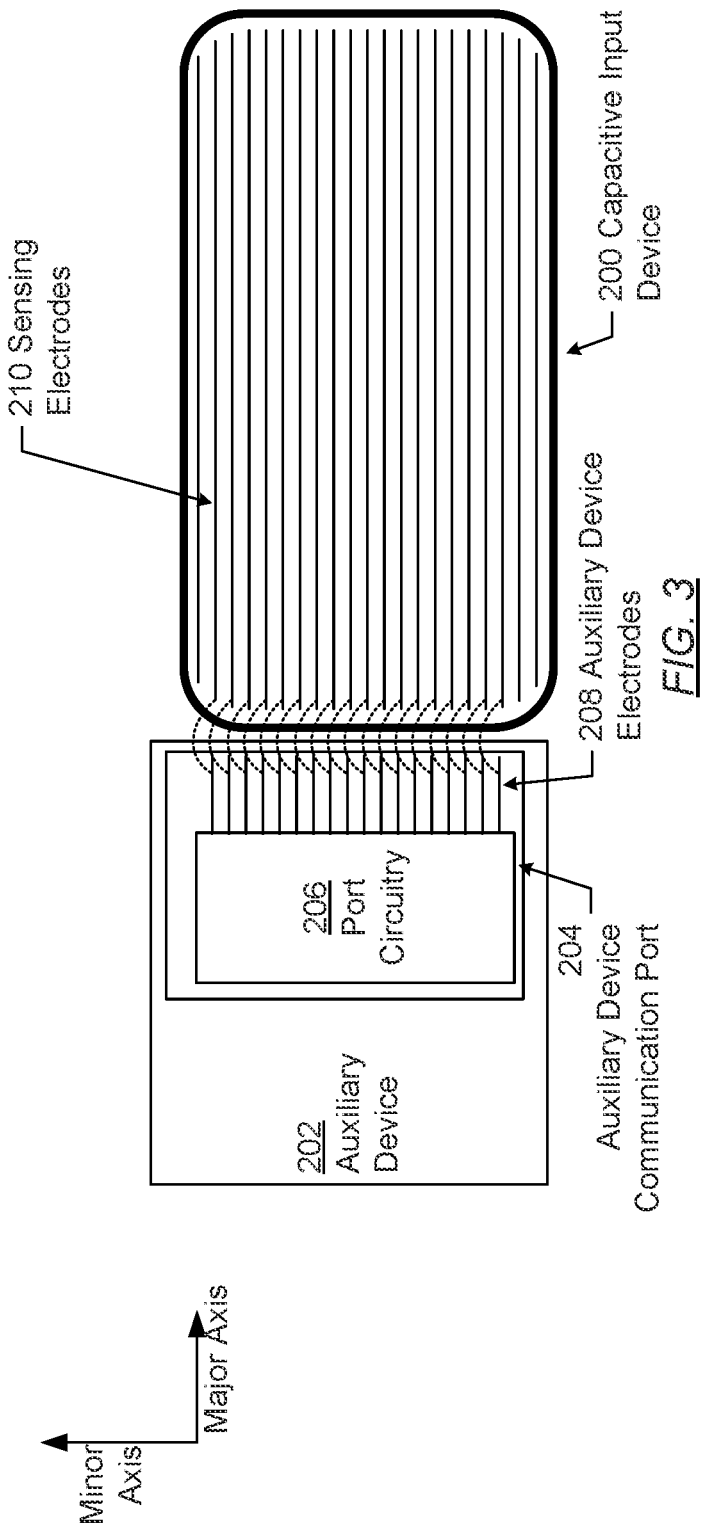
FIG. 3 is a block diagram of a system showing a first sensing electrodes that has a capacitive communication channel for auxiliary devices in accordance with an embodiment of the disclosure.
Figure 4:
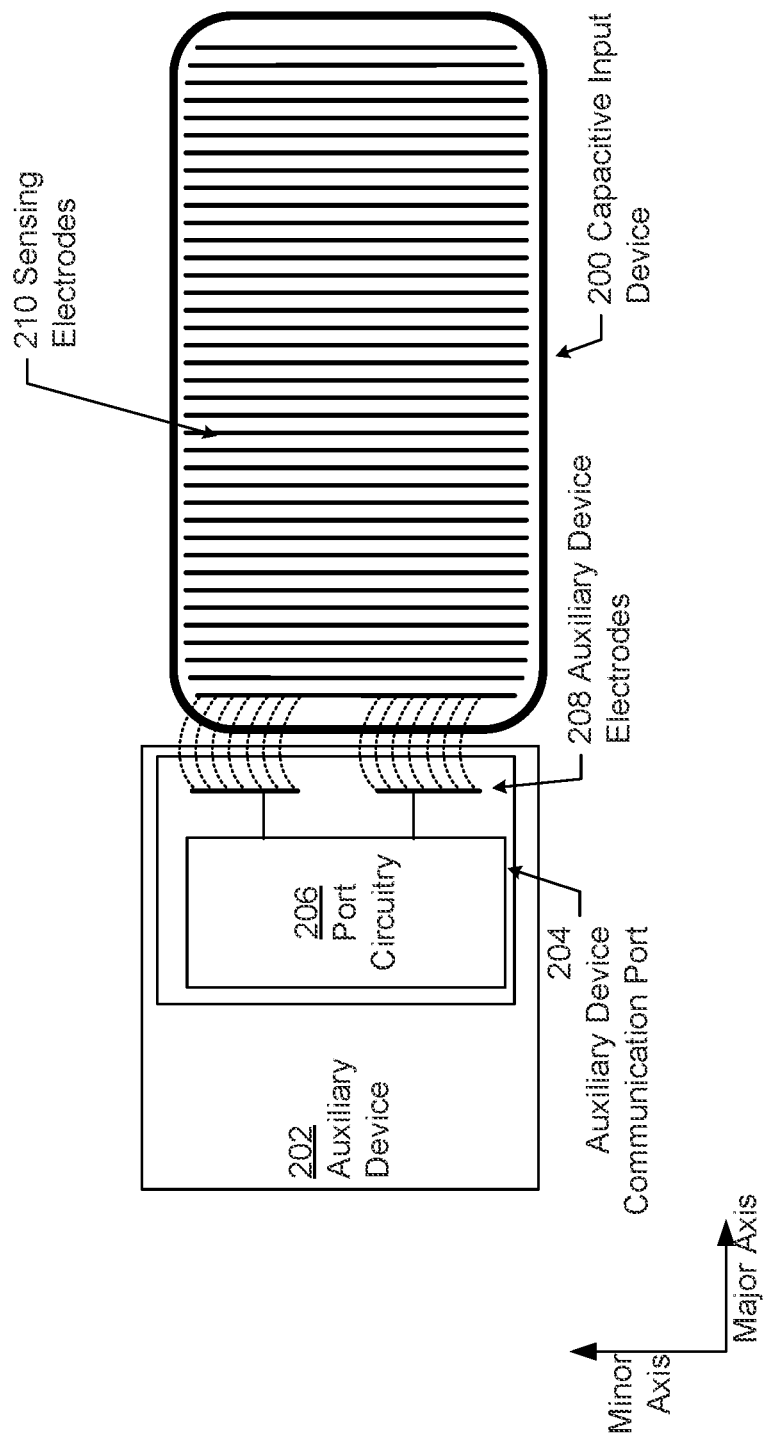
FIG. 4 is a block diagram of a system showing a second sensing electrodes that has a capacitive communication channel for auxiliary devices in accordance with an embodiment of the disclosure.

FIGS. 2, 3, and 4 show an example capacitive input device having a capacitive communication channel for auxiliary devices. A capacitive communication channel is a communication channel in which data signals are transmitted by modifying an electric field on one set of electrodes and detecting a change in capacitance on another set of electrodes. In the present application, the sets of electrodes refer to sensing electrodes on the input device and auxiliary device electrodes on the auxiliary device.

In the example, the capacitive input device (200) is a mobile device, such as a mobile phone or tablet, which includes a touchscreen (not shown). Other capacitive input devices may be similarly configured to perform capacitive communication with an auxiliary device.

In the example, the capacitive input device (200) includes sensing electrodes (210), which are shown as a grid in FIG. 2. The capacitive sensing electrodes are the sensing electrodes described above with reference to FIG. 1. In FIG. 2, although the capacitive sensing electrodes are shown as a grid, any arrangement, size, shape, or type of capacitive sensing electrodes may be used. For example, the sensing electrodes may be arranged in a sensing pattern that has an individual sensor electrode at each intersection of the grid rather than rows and columns of sensor electrodes. In another example, the sensing electrodes may be arranged in a single layer of electrodes.

The capacitive input device (200) is configured to be capacitively coupled to an auxiliary device (202). Further, the capacitive input device may be physically attached to the auxiliary device so as to be stationary with respect to the auxiliary device during the use of the capacitive input device. Thus, with respect to the auxiliary device, the capacitive input device is an attached capacitive input device and, with respect to the capacitive input device, the auxiliary device is an attached auxiliary device. In one or more embodiments, the attachment is temporary, such that an end user may separate the auxiliary device from the capacitive input device. Further, the attachment may be performed using connection mechanism, which may be a mechanical holder (e.g., harness, clip, strap, or other mechanical connection type), magnetic (e.g., using magnets of opposite polarity, etc.), or other connection mechanism. The holder may be, for example, due to the auxiliary device being wrapped around the capacitive input device, a tab or other mechanism. For example, the auxiliary device may be a smart cover of the capacitive input device. In such an example, the auxiliary device may at least partially wrap around the capacitive input device and the holder is the mechanism that keeps the auxiliary device wrapped around. Further, the connection mechanism may be configured to hold the auxiliary device (202) stationary relative to the capacitive input device (200). Thus, the auxiliary device (202) remains at a fixed position when in use with the capacitive input device.

The auxiliary device (202) is an input device that is configured to detect input from a user. The auxiliary device (202) may include input elements (not shown) to detect the input. An input element is a physical mechanism for receiving input. Example input elements include a button, a joystick, a wheel, a dial, a set of directional buttons, payment card slot, near field communication port for payment, touchscreen, capacitive or resistive electrodes, and other types of physical mechanisms.

Example auxiliary devices include a game controller, a dial on the front of the capacitive input device, a case for the capacitive input device that extends a functionality of the capacitive input device, a payment device, or another type of auxiliary device for receiving input. The auxiliary device may be an extension to a smartphone that transforms the smartphone to a flip phone. As another example, the auxiliary device may be a smart cover for a mobile device that adds buttons to the mobile device to create additional ways for a user to communicate with the mobile device.

In one or more embodiments, the auxiliary device (202) includes an auxiliary device communication port (204). The auxiliary device communication port (204) is a communication port for capacitive based communication. Other ports for electromagnetic communication may exist on the auxiliary device (202), such as radio-based communication ports and wired ports. The auxiliary device communication port (204) includes port circuitry (206) and auxiliary device electrodes (208). The port circuitry (206) is circuitry configured to encode data from the input elements of auxiliary device (202) into a signal for capacitive communication. The data in a data stream may include binary data (e.g. switches open/closed) and digitized measurements (e.g. force/pressure). The port circuitry (206) is further configured to transmit the signal on the auxiliary device electrodes (208).

On the receiver side, the port circuitry (206) includes functionality to receive resulting signals via the auxiliary device electrodes (208) and decode the resulting signals. The resulting signals result from a transmitter signal on the transmitter electrodes of the capacitive input device (200). The port circuitry (206) may further be configured to transmit the decoded signal to a processor of the auxiliary device (202).

The auxiliary device electrodes (208) may have the same functionality of the sensing electrodes discussed above with reference to FIG. 1. Specifically, the auxiliary device electrodes may be receiver electrodes and transmitter electrodes. The same auxiliary device electrode may be both a receiver electrode and a transmitter electrode. Alternatively, a dedicated subset of the auxiliary device electrodes may be receiver electrodes while another dedicated subset are transmitter electrodes.

Various techniques may be used by the capacitive input device and the auxiliary device to encode the data into a signal that can be transmitted capacitively. The capacitive input device and the auxiliary device have a predefined technique for encoding data, and use the same technique in one or more embodiments. For example, the technique may be binary phase shift keying (BPSK), amplitude modulation, phase modulation, and/or frequency modulation.

As shown by coordinate definition (212), the capacitive input device has a minor axis and a major axis. The length of capacitive input device along the minor axis is shorter than the length of the capacitive input device along the major axis. Further, the major and minor axes are perpendicular to each other and parallel to the input surface of the capacitive input device. For example, the major and minor axes may be along the sides of a display screen.

Different capacitive couplings may be used between the auxiliary device (202) and the capacitive input device (200). FIGS. 3 and 4 show different configurations having different respective capacitive couplings (denoted by the dotted lines of FIGS. 2, 3, and 4). In the configuration of FIG. 3, the auxiliary device communication port (204) has auxiliary device electrodes (208) that capacitively couple with sensing electrodes aligned perpendicular to the side with which the auxiliary device (202) is adjacent. The attached auxiliary device is attached to a side of the capacitive input device that is along the minor axis, and the sensing electrodes and auxiliary device electrodes are perpendicular to the minor axis. More generally, the auxiliary device electrodes are perpendicular to the side of the capacitive input device in which the auxiliary device is attached.

In the configuration of FIG. 4, the auxiliary device communication port (204) has auxiliary device electrodes (208) that capacitively couple with at least one sensing electrode aligned parallel to the side with which the auxiliary device (202) is adjacent. The attached auxiliary device is attached to a side of the capacitive input device that is along the minor axis, and the sensing electrodes and auxiliary device electrodes are parallel to the minor axis. More generally, the auxiliary device electrodes are parallel to the side of the capacitive input device in which the auxiliary device is attached.

The difference between the respective configurations of FIGS. 3 and 4 is the amount of capacitive coupling versus throughput between the auxiliary device electrodes of the auxiliary device (202) and the sensing electrodes of the capacitive input device (200). In FIG. 3, because more sensing electrodes are adjacent to the auxiliary device, more communication channels exist between the capacitive input device and the port circuitry (206). Thus, a greater throughput of data is available on the configuration of FIG. 3 as compared to FIG. 4. In FIG. 4, while fewer sensing electrodes are adjacent, a larger portion of a sensing electrode is adjacent. Thus, a greater capacitive coupling exists between electrodes in FIG. 4 as compared to FIG. 3. Accordingly, the configuration of FIG. 3 may allow for greater data bandwidth, (e.g., for increased responsiveness of the user interface of the electronic system), while the configuration of FIG. 4 may allow for a greater separation between the auxiliary device electrodes and the sensing electrodes. For example, FIG. 3 may allow for around a two to three millimeters between electrodes or up to ten millimeters while FIG. 4 may allow for a ten to fifteen-millimeter gap in one or more embodiments. Other gaps may also be possible without departing from the scope of the disclosure.

Although FIGS. 2-4 shows a shorter side of the capacitive input device (200) being adjacent to the auxiliary device (202), the longer side, front side, or backside of the capacitive input device (200) may be adjacent to the auxiliary device (202). In each configuration, at least one sensing electrode of the capacitive input device (200) is adjacent to at least one auxiliary device electrode (208) of the auxiliary device. For example, if on the backside, then the sensing electrode may be a floating electrode, a zero-dimensional button electrode, fingerprint sensor, or other configuration.

In one or more embodiments, the capacitive input device includes functionality to operate in one of two modes, a touch sensing mode and an auxiliary device mode. In a touch-sensing mode, the capacitive input device performs proximity sensing (e.g., detection of input object in the sensing region). In the auxiliary device mode, the capacitive input device performs capacitive communication with an auxiliary device. The distinction between the two modes is as follows.

In the touch sensing mode, resulting signals are reflective of a position of the input object on the sensing region. To identify a location of the input object, resulting signals are acquired. Various filtering is performed on the resulting signals to remove noise. The location of the input object may be determined based on peaks in the resulting signals from different sensor electrodes.

In the auxiliary device mode, the auxiliary device is stationary. Thus, the resulting signal only has encoded data and noise at specific electrodes because there is no signal caused by movement of the auxiliary device. Once filtering is performed to remove the effects of noise, the encoded data is decoded to obtain data. The data may then be passed to the electronic system to perform resulting actions.

Figure 5:
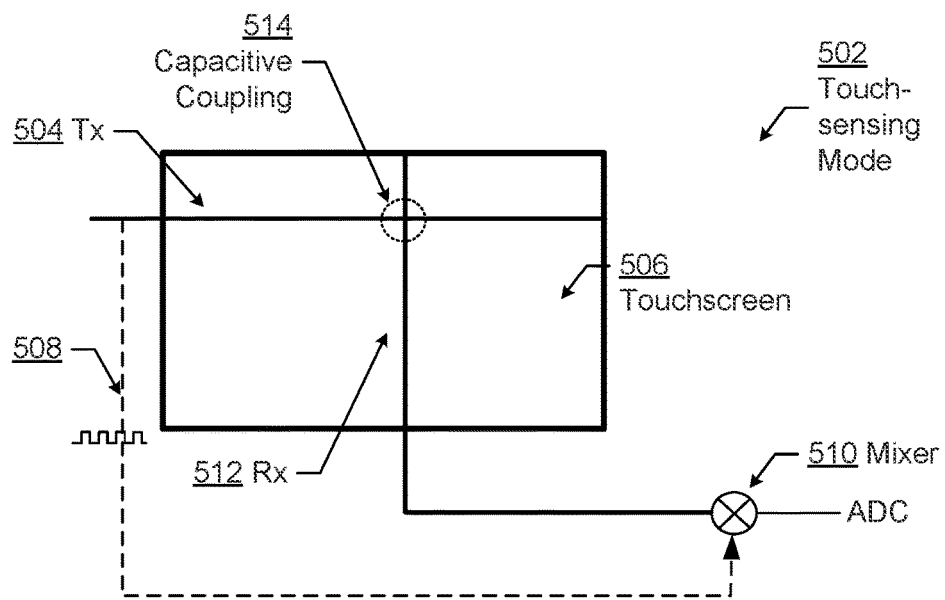
FIG. 5 is an example communication channel for operating in touch mode and in auxiliary device mode in accordance with an embodiment of the disclosure.
Figure 5:
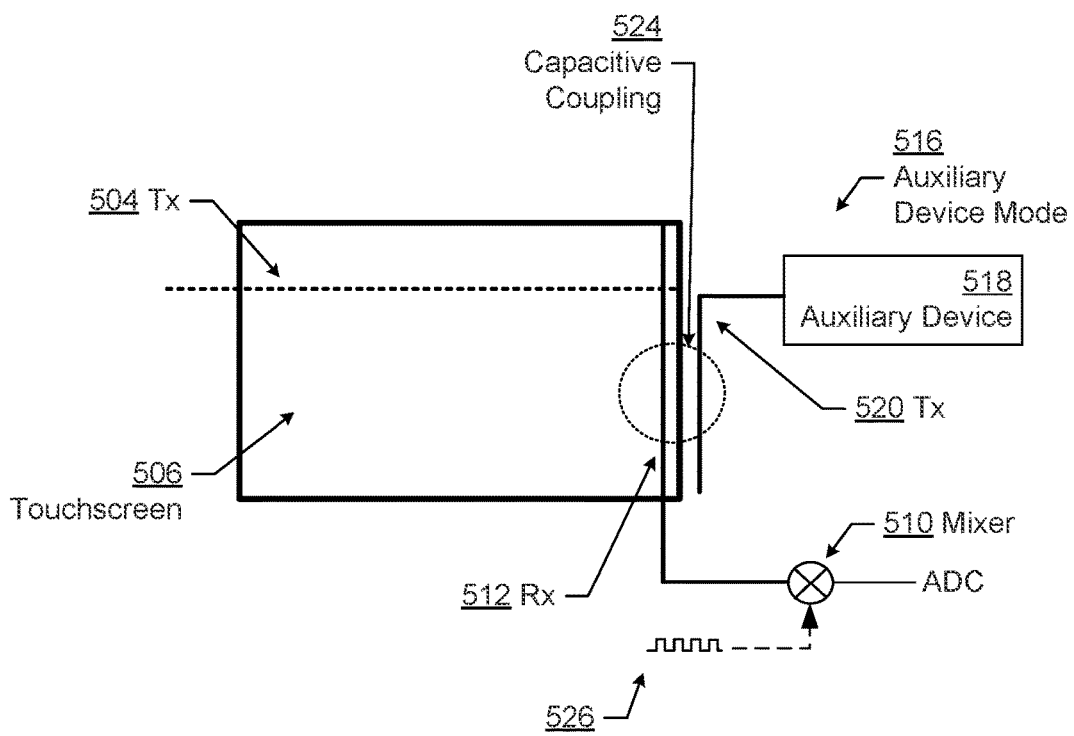

Another distinction between different modes is whether the transmitter signal is known to the input device. The capacitive input device may identify the auxiliary device through a protocol. As shown in FIG. 5, in the touch sensing mode (502), the transmitter signal is transmitted on the transmitter electrode Tx (504) of a touchscreen (506) as well as separately sent via traces (508) (not explicitly shown) to the mixer (510). The receiver electrode Rx (512) receives resulting signals via capacitive coupling (514) and transmits the resulting signals to the mixer (510). The mixer (510) uses the transmitter signal to demodulate the resulting signals and send the result to the analog to digital converter (ADC in FIG. 5).

In the auxiliary device mode (516), the transmitter electrode (504) is not used to receive signals. Rather, in the auxiliary device mode (516), the auxiliary device (518) has a transmitter electrode Tx (520) that is proximate to the receiver electrode (512) of the touchscreen (506). The proximity creates a capacitive coupling (524) between the transmitter electrode (520) and the receiver electrode (512). The receiver electrode (512) is coupled to mixer (510) to pass the resulting signals to the mixer (510). However, the transmitter signal (526) is not known to the mixer (510). Thus, the mixer (510) performs in-phase and quadrature (I/Q) demodulation on the resulting signal.

Various techniques may be used to perform mode switching. In some embodiments, switching between modes is performed by the capacitive input device periodically transmitting a signal to detect an auxiliary device. When the auxiliary device responds, the capacitive input device may switch to auxiliary device mode. Once in auxiliary device mode, the capacitive input device may periodically switch between touch mode and auxiliary device mode to receive data from an auxiliary device and detect touch input. The switch may be within a defined number of microseconds to be undetectable to a user.

As another example, when the capacitive input device switches to auxiliary device mode, the capacitive input device may stay in auxiliary device mode until the auxiliary device stops transmitting for a threshold amount of time or until a command via the data in the capacitive communication channel is received to perform the switch. Other techniques for performing mode switching may be used without departing from the scope of the disclosure.

Figure 6:
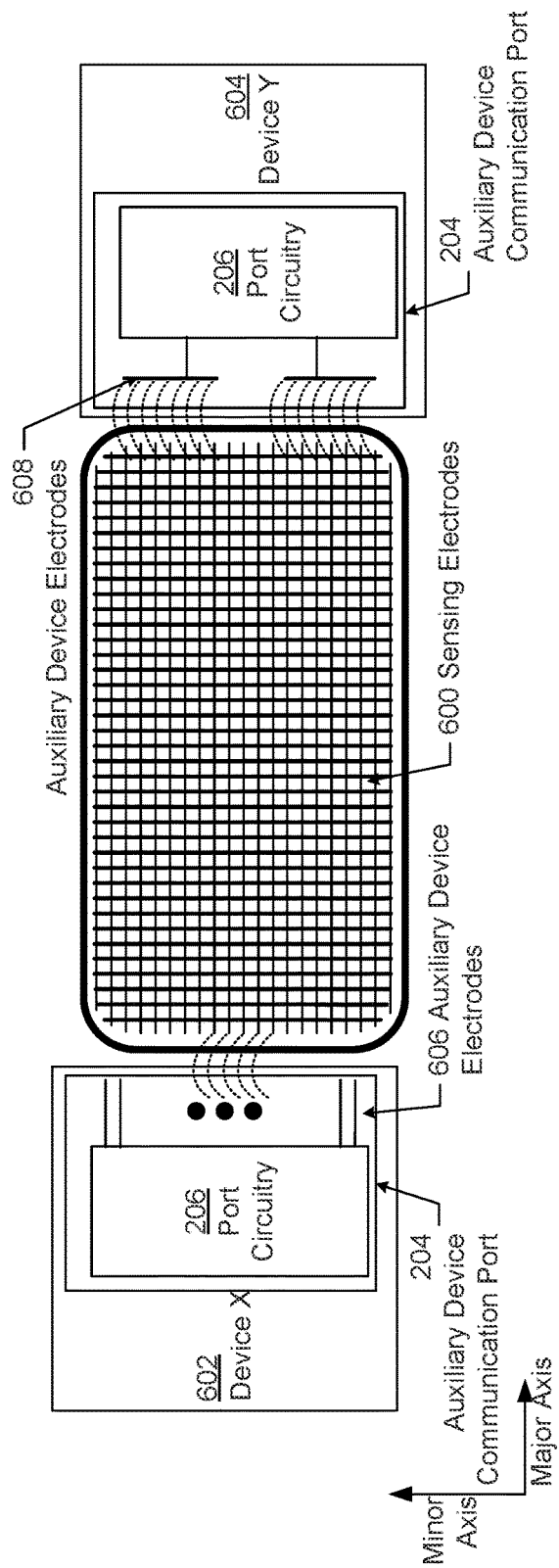
FIG. 6 is an example of a system with two auxiliary devices in accordance with one or more embodiments.
Figure 7:
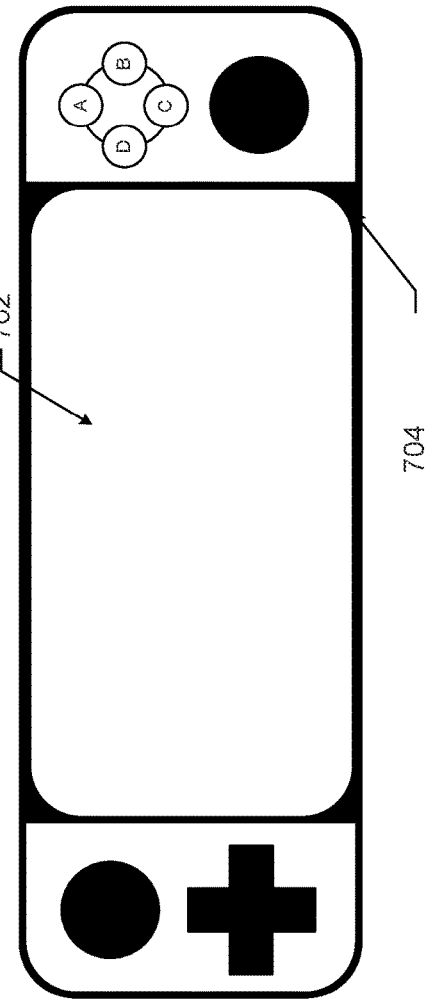
FIG. 7 is an example of capacitive communication channel with a gaming controller in accordance with one or more embodiments.

FIGS. 6 and 7 show an example of using a capacitive communication channel for two auxiliary devices. As shown in FIG. 6, sensing electrodes (600) may communicate with two auxiliary devices (e.g., device X (602) and device Y (604)). The communication with device X (602) using the configuration of FIG. 3 while the communication with device Y (604) using the configuration of FIG. 4. Specifically, the left side auxiliary device electrodes (606) has been configured for maximum bandwidth by the eight auxiliary device electrodes designed to couple with eight long sensing electrodes (600) of the major axis. The coupling of the left side auxiliary device electrodes (606) requires higher voltage for the signal to noise ratio to be equivalent with the right side auxiliary device electrodes (608) which is optimized for low power. The right side auxiliary device electrodes (608) could operate, by way of an example, with a single 1.5 V power supply since the surface area for coupling is much larger. Furthermore, on the right side, one of the sensing electrodes (600) of the minor axis couples with both the Tx and Rx sections of auxiliary device electrodes (608). When the mobile device is transmitting with sensing electrodes (600) on the right, both sections of auxiliary device electrodes (608) are driven. In the coupling region on the right, the auxiliary device (i.e., device Y (604)) has two electrodes which may be dynamically configured as any combination of receiver/transmitter by the device.

An example of FIG. 6 is shown in FIG. 7. In FIG. 7, the system with two auxiliary devices is a gaming controller (700) for use with a mobile device. As shown by the white outline (702), the mobile device may be a mobile phone with a touchscreen. The harness (704) that keeps the gaming controller stationary is a cradle of the gaming controller for the mobile device. The mobile device executes and displays the game that the user may play with the gaming controller. Communication between the mobile device and the gaming controller is achieved through the capacitive communication channels as shown in FIG. 6. In the multiple channel version, the mobile device appears more responsive. With the gaming controller, the user generally has hands on both sides of the gaming controller. However, the user may switch by touching the touchscreen. In such a scenario, the capacitive mobile device switches to touchscreen mode. By using capacitive communication, ports of the mobile device and gaming controller may be used for other uses, such as connecting to audio input/output devices.

For the gaming console (700), a centralized controller of the gaming console may bundle user inputs from both sides into a single payload. The payload may be transferred over a single capacitive coupling link. For the case of two or more connecting auxiliary devices, the two or more device may pair with separate electrodes. Other techniques may be used without departing from the scope of the disclosure.

Another aspect of the invention is management of the frame budget for a capacitive sensing frame of the capacitive input device. As discussed above, the capacitive input device may operate the auxiliary device mode, touchscreen mode or combined mode. In auxiliary device mode, the frame budget is optimized for high sampling rate and low latency of data from the auxiliary device. During the auxiliary device mode, the capacitive input device operates in a sleep mode to check, at a low frequency, for any proximate input objects in the sensing region. If proximate input objects are detected, the capacitive input device switches to touchscreen mode. The touchscreen mode favors scanning for fingers. The system will also support conventional USI pens. The combined mode refers to switching between auxiliary device mode and touchscreen mode repetitively in a single frame.

Figure 8:
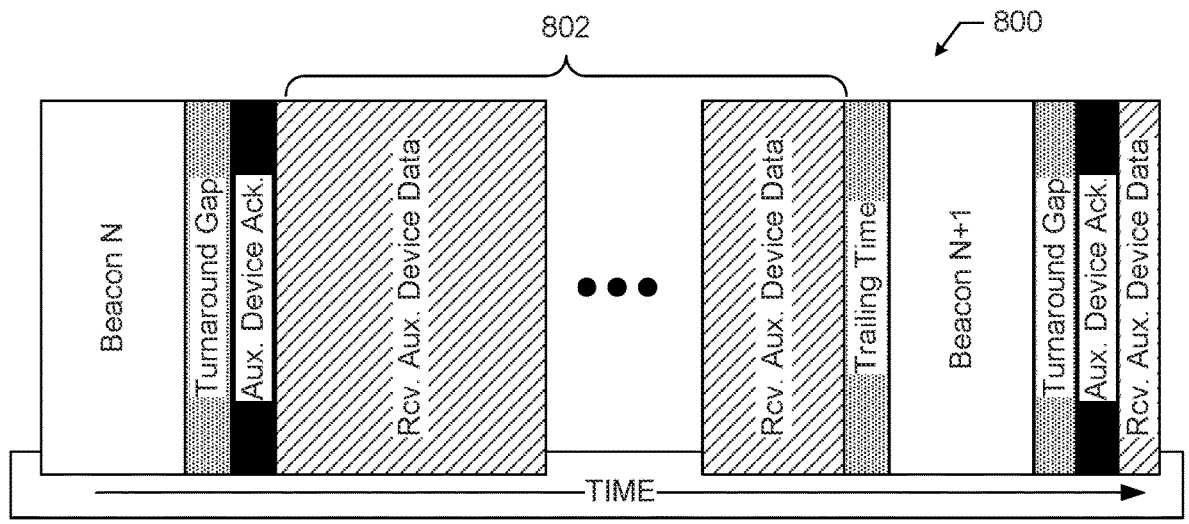
FIG. 8 is an example of a communication timing diagram that may be modified to operate a capacitive communication channel in accordance with one or more embodiments.

FIG. 8 is an example of a communication timing diagram (800) that may be modified to operate a capacitive communication channel in accordance with one or more embodiments.

Initiating communication with the auxiliary device may be performed as follows. While in touchscreen mode, the capacitive input device periodically transmits a beacon signal (denoted as beacon N and beacon N+1 in FIG. 8). If no response occurs, the capacitive input device continues to perform touchscreen mode-based sensing. Touchscreen mode based sensing means that the sensing circuitry drives at least a portion of the sensing electrodes with sensing signals, and receives resulting signals that result from the sensing signals and the capacitive coupling between sensing electrodes. The resulting signals may be modified versions of the sensing signals based on noise and any input objects present in the sensing region. From the resulting signals, positional information of any present input objects is determined.

Returning to FIG. 8 and the beacon signal, if an auxiliary device is present, the auxiliary device responds to the beacon signal and the capacitive input device with an auxiliary device acknowledgement. The auxiliary device acknowledgement may include identifying information (e.g., a device code that uniquely identifies the type of auxiliary device, such as a product code). The capacitive input device may then gather device information, using the identifying information, for the auxiliary device. The device information may include information for decoding data received from the auxiliary device, number, and types of input elements, etc. At this stage, the input device is configured to receive and decode data from the auxiliary device. The auxiliary device obtains input from a user via an input element, processes the input to obtain data, and encodes the data into data signals for transmission to the capacitive input device. The capacitive input device receives the auxiliary device data as data signals during time (802), and decodes the data to obtain decoded data. At the end of time (802), trailing time may be added for the capacitive input device to finish receiving the encoded data. Because the auxiliary device is temporarily attached and may be detached at any time, the capacitive input device may periodically, at a predefined frequency, transmit the beacon signal to start the processing anew. The process may repeat with beacon N+1 regardless of whether the auxiliary device is detached in order to continue communication. Although not shown, the communication may be two-way communication by adding information in the beacon signal or adding a time period, not shown, in the timing diagram.

Figure 9:
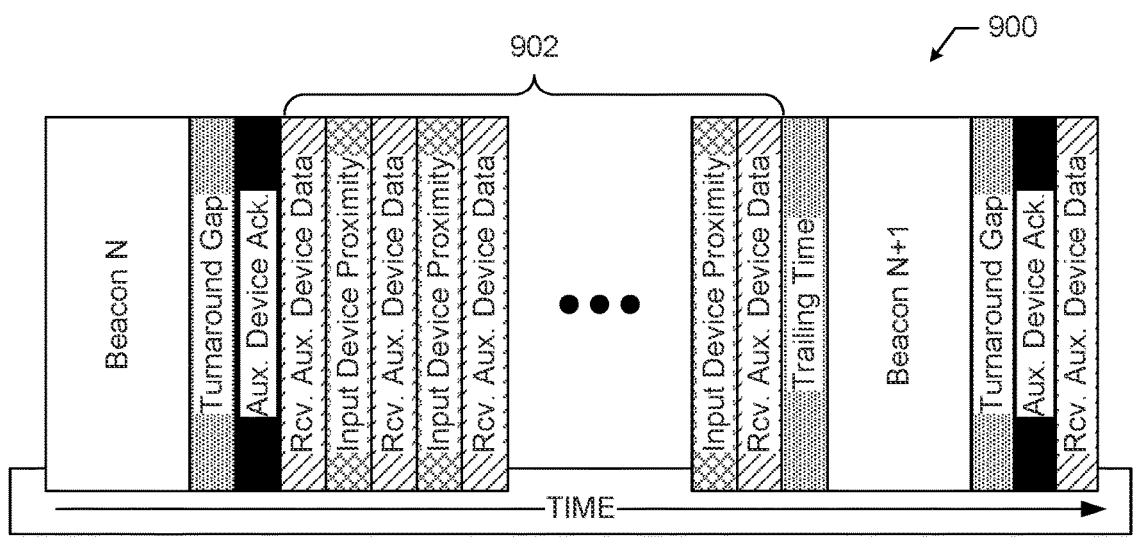
FIG. 9 is an example of a communication timing diagram that is modified to operate a capacitive communication channel in accordance with one or more embodiments.

FIG. 9 is an example of a communication timing diagram (900) that is modified to operate a capacitive communication channel in accordance with one or more embodiments. In the timing diagram of FIG. 9, the data packets are interleaved with touch sensing during time (902). Specifically, the driving of the transmitting sensing electrodes on the capacitive input device and receiving resulting signals is interleaved with receiving data signals from the auxiliary device. Thus, using the configuration of FIG. 9, a user may concurrently use both the touch input as well as the auxiliary device. The capacitive input device switches between modes during a single frame in the example.

Whether the timing diagram of FIG. 8 or FIG. 9 is used is predefined between the capacitive input device and the auxiliary device. One method to effectuate the communication between the auxiliary device and the capacitive input device is to repurpose the Universal Stylus Initiative (USI) standard for the auxiliary device.

In some embodiments, because the mobile device is stationary with respect to the capacitive input device, the beacon may be ignored or only periodically used.

Using capacitive communications channels may provide for a lower latency, faster update rates, lower power consumption and lower cost for auxiliary devices such as gaming consoles which attach to smartphones. The touch controller may interact with auxiliary devices over the capacitive channel to transport user interactions to the host processor and applications. Further, one or more embodiments may use time-slicing for communication modes, including capacitive communication. For example, one or more embodiments may be used in cases of the capacitive input device not having a physical port (e.g., universal serial bus (USB) port). Further, one or more embodiments may be used to replace and/or supplement Bluetooth connection.

Thus, the embodiments and examples set forth herein were presented in order to best explain various embodiments and the particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

What is claimed is:

1. A capacitive input device comprising:
a first plurality of sensing electrodes configured to form a first capacitive coupling with a first plurality of auxiliary device electrodes of a first attached auxiliary device,
wherein the first plurality of auxiliary device electrodes transmits data signals to the first plurality of sensing electrodes via the first capacitive coupling; and
processing circuitry configured to decode the data signals received via the first capacitive coupling to obtain decoded data.

2. The capacitive input device of claim 1, wherein:
the first plurality of sensing electrodes extends along a direction that is perpendicular to a side of the capacitive input device that is adjacent to the first attached auxiliary device.

3. The capacitive input device of claim 1, wherein:
the first plurality of sensing electrodes extends along a direction that is parallel to a side of the capacitive input device that is adjacent to the first attached auxiliary device.

4. The capacitive input device of claim 1, further comprising:
a second plurality of sensing electrodes different from the first plurality of sensing electrodes, the second plurality of sensing electrodes configured to form a second capacitive coupling with a second plurality of auxiliary device electrodes of a second attached auxiliary device.

5. The capacitive input device of claim 1, further comprising:
a second plurality of sensing electrodes forming a second capacitive coupling with the first plurality of sensing electrodes; and
sensing circuitry coupled to the first plurality of sensing electrodes and the second plurality of sensing electrodes, the sensing circuitry configured to:
drive a third plurality of sensing electrodes with sensing signals,
receive resulting signals from the first plurality of sensing electrodes resulting from the sensing signals and the second capacitive coupling.

6. The capacitive input device of claim 5, wherein the sensing circuitry is further configured to:
receive the data signals via the first capacitive coupling,
wherein the receiving of the data signals is interleaved with the driving of the third plurality of sensing electrodes and receiving the resulting signals.

7. The capacitive input device of claim 5, wherein the capacitive input device comprises a touchscreen defining a sensing region, and wherein the processing circuitry is further configured to:
determine positional information of an input object in the sensing region from the resulting signals,
wherein the input object is distinct from the first attached auxiliary device.

8. The capacitive input device of claim 1, wherein the capacitive input device is configured to:
transmit a beacon signal using a plurality of electrodes comprising the first plurality of sensing electrodes,
receive an auxiliary device acknowledgement for the first attached auxiliary device, and
modify a timing of driving a second plurality of sensing electrodes based on receiving the auxiliary device acknowledgement.

9. The capacitive input device of claim 8, wherein modifying the timing comprises halting driving the second plurality of sensing electrodes in order to receive the data signals.

10. The capacitive input device of claim 8, wherein modifying the timing comprises interleaving driving the second plurality of sensing electrodes and receiving resulting signals with receiving the data signals.

11. A system comprising a first auxiliary device comprising:
a first input element configured to receive first input from a user;
a first processing component coupled to the first input element and configured to process the first input to obtain first data; and
first port circuitry coupled to the first processing component and comprising a first plurality of auxiliary device electrodes configured to form a first capacitive coupling with a first plurality of sensing electrodes of an attached capacitive input device, the first port circuitry configured to drive the first plurality of auxiliary device electrodes with first data signals encoding the first data.

12. The system of claim 11, wherein the first auxiliary device is a gaming controller.

13. The system of claim 11, further comprising:
a second auxiliary device comprising:
   a second input element configured to receive second input from the user,
   second processing component coupled to the second input element and configured to process the second input to obtain second data, and
   second port circuitry coupled to the second processing component and comprising a second plurality of auxiliary device electrodes configured to form a second capacitive coupling with a second plurality of sensing electrodes of the attached capacitive input device,
      the second port circuitry configured to drive the second plurality of auxiliary device electrodes with second data signals encoding the second data,
wherein the first plurality of sensing electrodes and second plurality of sensing electrodes are different electrodes.

14. The system of claim 11, further comprising:
a harness for attaching the first auxiliary device and a second auxiliary device to two sides of the attached capacitive input device.

15. The system of claim 11, wherein the first auxiliary device is a payment device.

16. A method comprising:
attaching a first auxiliary device to a capacitive input device;
receiving, by the capacitive input device, first input from a first input element of the first auxiliary device;
generating first data signals from the first input; and
transmitting first data signals via a first capacitive coupling between a first plurality of auxiliary device electrodes on the first auxiliary device and a first plurality of sensor electrodes on the capacitive input device.

17. The method of claim 16, further comprising:
receiving a beacon signal from the capacitive input device, and
responding to the beacon signal with an auxiliary device acknowledgement.

18. The method of claim 16, further comprising:
attaching a second auxiliary device to the capacitive input device;
receiving, by the capacitive input device, second input from a second input element of the second auxiliary device;
generating second data signals from the second input; and
transmitting second data signals via a second capacitive coupling between a second plurality of auxiliary device electrodes on the second auxiliary device and a second plurality of sensor electrodes on the capacitive input device.

19. The method of claim 18, wherein the transmitting of the first data signals and the second data signals are performed concurrently.

20. The method of claim 16, wherein the first auxiliary device is a gaming controller.

* * * * *